(12) United States Patent
Newport et al.

(10) Patent No.: US 8,364,636 B2
(45) Date of Patent: Jan. 29, 2013

(54) REAL TIME DATA REPLICATION

(75) Inventors: William T. Newport, Rochester, MN (US); John J. Stecher, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 575 days.

(21) Appl. No.: 12/558,898

(22) Filed: Sep. 14, 2009

(65) Prior Publication Data
US 2011/0066592 A1 Mar. 17, 2011

(51) Int. Cl.
*G06F 17/00* (2006.01)
(52) U.S. Cl. .................. 707/612; 707/637; 707/640
(58) Field of Classification Search .......... 707/612, 707/615, 637, 640
See application file for complete search history.

(56) References Cited

U.S. PATENT DOCUMENTS

| | | | | |
|---|---|---|---|---|
| 5,806,074 | A * | 9/1998 | Souder et al. | 707/610 |
| 6,324,654 | B1 * | 11/2001 | Wahl et al. | 714/6.12 |
| 6,615,223 | B1 * | 9/2003 | Shih et al. | 707/625 |
| 7,039,661 | B1 * | 5/2006 | Ranade | 707/610 |
| 7,082,446 | B1 * | 7/2006 | Bottomley | 707/610 |
| 7,177,866 | B2 * | 2/2007 | Holenstein et al. | 707/615 |
| 7,698,308 | B2 * | 4/2010 | Kan et al. | 707/610 |
| 7,940,206 | B2 * | 5/2011 | Nohara et al. | 342/59 |
| 7,962,458 | B2 * | 6/2011 | Holenstein et al. | 707/704 |
| 8,126,848 | B2 * | 2/2012 | Wagner | 707/648 |
| 8,214,329 | B2 * | 7/2012 | Gilder et al. | 707/622 |
| 2005/0149578 | A1 * | 7/2005 | Sustman et al. | 707/615 |
| 2009/0201190 | A1 * | 8/2009 | Huthoefer et al. | 342/27 |

OTHER PUBLICATIONS

Ciciani, Bruno et al., "Analysis of Replication in Distributed Database Systems", IEEE Transactions on Knowledge and Data Engineering, vol. 2, No. 2, Jun. 1990, pp. 247-261.*

* cited by examiner

*Primary Examiner* — Shahid Alam
(74) *Attorney, Agent, or Firm* — Martin & Associates LLC

(57) ABSTRACT

A combination of synchronous and asynchronous replication of data is used to replicate a local database to a replicated database. The typical tradeoff between synchronous and asynchronous replication is optimized by using hybrid replication, which is to use synchronous replication for inserting new data and asynchronous replication for updating existing data. The combined use of synchronous and asynchronous in this manner provides an efficient replicated database where the replicated database can tolerate some delay in data updates but requires no data loss of new data.

4 Claims, 3 Drawing Sheets

REAL TIME DATA REPLICATION

BACKGROUND

1. Technical Field

This disclosure generally relates to replication of computer resources, and more specifically relates to data replication which combines synchronous and asynchronous methods to provide fast and efficient real time data replication.

2. Background Art

There is an ever increasing need for reliable high speed data processing systems. These data processing systems require data repositories that can provide critical data at any moment in time in the face of interruptions caused by hardware failure, software failure, natural disaster, etc. To achieve the necessary data availability, many data systems utilize remote data repositories to backup and store critical data. A common means of fast data backup to the remote data repositories is by database replication.

With database replication, the database management system can make informed decisions on whether to write data to multiple local storage devices or to a local storage device and a remote storage device, but such synchronization comes at a significant performance penalty. The technique of replicating data to multiple storage devices simultaneously is also known as mirroring. Data replication is typically either synchronous or asynchronous. In synchronous data replication, the replicated database is kept updated with current information in the primary database. In this manner, critical data can be accessible at all times. Ensuring transaction and record consistency often results in data transmission latency when a large number of data transmissions to remote sites are necessary with each database update. Consequently, application performance may be slowed to unacceptable levels.

Database replication systems also use asynchronous replication. In asynchronous systems, the data in the replicated database is updated in batches or at specified intervals. While asynchronous systems use less system resources, they do not guarantee there will be no data loss on the replicated database if a failure of the primary database occurs. Therefore, applications that require no loss of data at the replicated database often cannot employ asynchronous replication and thus rely on slower synchronous replication techniques.

While asynchronous systems are faster and use less system resources, they do not guarantee there will be no data loss on the replicated database. Synchronous replication systems can guarantee no loss of data but are slower and have a higher cost to system resources. Thus there is a tradeoff between using asynchronous and synchronous data replication.

BRIEF SUMMARY

The disclosure and claims herein are directed to data replication using a combination of synchronous and asynchronous replication of data from a local database to a replicated database. The typical tradeoff between synchronous and asynchronous replication is optimized by using hybrid replication, which is to use synchronous replication for inserting new data and asynchronous replication for updating existing data. The combined use of synchronous and asynchronous in this manner provides an efficient replicated database where the replicated database can tolerate some delay in data updates but requires no data loss of new data.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

DETAILED DESCRIPTION

Figure 1:
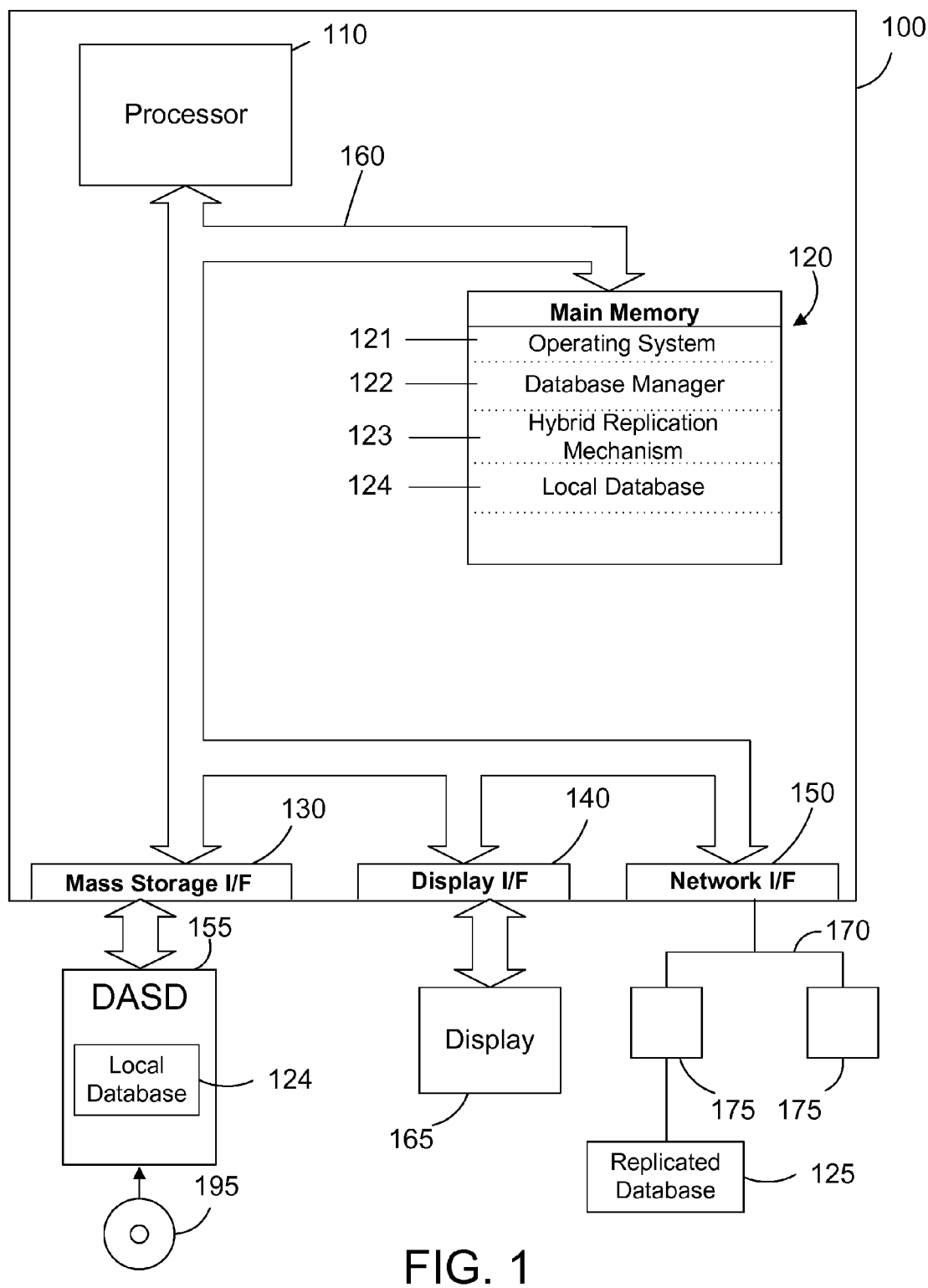
FIG. 1 is a block diagram of a computer system with a hybrid replication mechanism to replicate a database as described herein.

The disclosure and claims herein are directed to data replication using a combination of synchronous and asynchronous replication of data from a local database to a replicated database. The typical tradeoff between synchronous and asynchronous replication is optimized by using hybrid replication, which is to use synchronous replication for inserting new data and asynchronous replication for updating existing data. The combined use of synchronous and asynchronous in this manner provides an efficient replicated database where the replicated database can tolerate some delay in data updates but requires no data loss of new data.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring to FIG. 1, a computer system 100 is one suitable implementation of a computer system that includes a hybrid replication mechanism as described herein. Computer system 100 is an International Business Machines Corporation (IBM) iSeries computer system. However, those skilled in the art will appreciate that the disclosure herein applies equally to any computer system, regardless of whether the computer system is a complicated multi-user computing apparatus, a single user workstation, or an embedded control system. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices with a computer readable medium, such as direct access storage devices 155, to computer system 100. One specific type of direct access storage device 155 is a readable and writable CD-RW drive, which may store data to and read data from a CD-RW 195.

Main memory 120 preferably contains an operating system 121. Operating system 121 is a multitasking operating system known in the industry as i5/OS; however, those skilled in the art will appreciate that the spirit and scope of this disclosure is not limited to any one operating system. The memory further includes a database manager 122 that includes a hybrid replication mechanism 123. The memory further contains at least a portion of a local database 124. The local database 124 may also be stored in the direct access storage device 155 and portions of the database may be loaded into memory 120 as needed. These entities in memory are described further below.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while operating system 121, database manager 122, hybrid replication mechanism 123, and local database 124 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 121 and later executes the program instructions that make up the database manager 122 and hybrid replication mechanism 123.

Although computer system 100 is shown to contain only a single processor and a single system bus, those skilled in the art will appreciate that a virtualization manager may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect computer system 100 to other computer systems or workstations 175 via network 170. These other computer systems 175 preferably include one or more replicated databases 125. Network interface 150 broadly represents any suitable way to interconnect electronic devices, regardless of whether the network 170 comprises present-day analog and/or digital techniques or via some networking mechanism of the future. In addition, many different network protocols can be used to implement a network. These protocols are specialized computer programs that allow computers to communicate across a network. TCP/IP (Transmission Control Protocol/Internet Protocol) is an example of a suitable network protocol.

Figure 2:
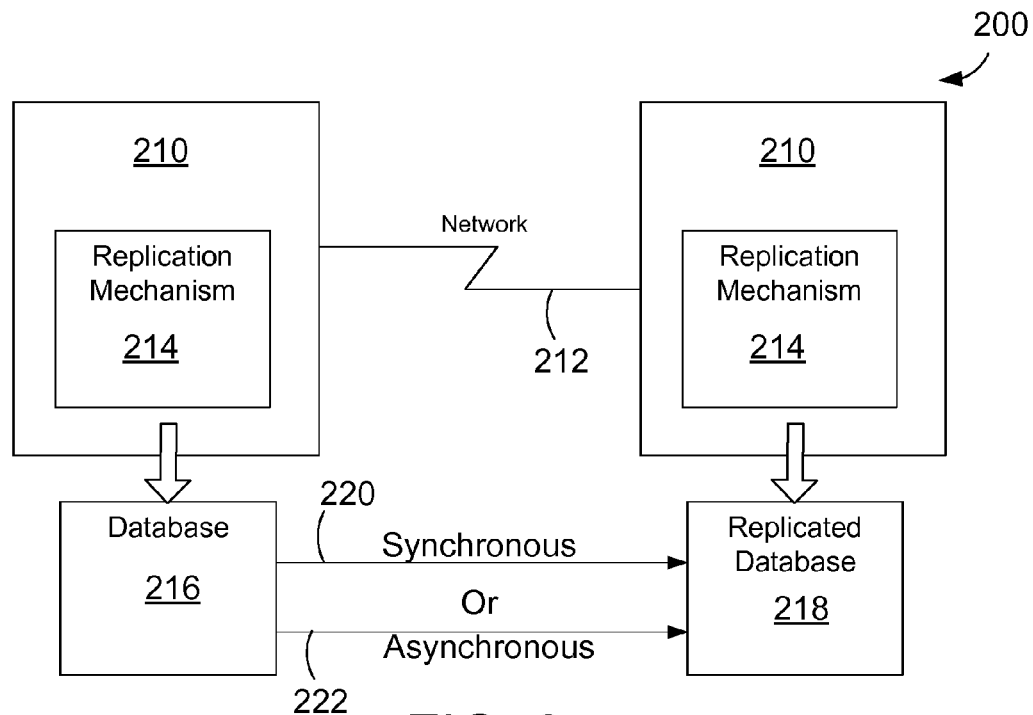
FIG. 2 is a block diagram of a replication system according to the prior art.

FIG. 2 illustrates a block diagram of a computer system 200 with data replication according to the prior art. The system 200 includes two computers 210 connected with a network 212. Each computer 210 includes a replication mechanism 214 that together replicate a local database 216 to a replicated database 218. The local database 216 may be replicated to the replicated database 218 using synchronous 220 or asynchronous 222 replication. The prior art system 200 employs synchronous 220 or asynchronous 222 replication depending on the needs of the application and the constraints of the overall system hardware. Note, however known prior art systems (such as 200 in FIG. 2) use one or the other, synchronous or asynchronous replication. Prior art systems do not use both synchronous and asynchronous replication in the manner described herein.

Figure 3:
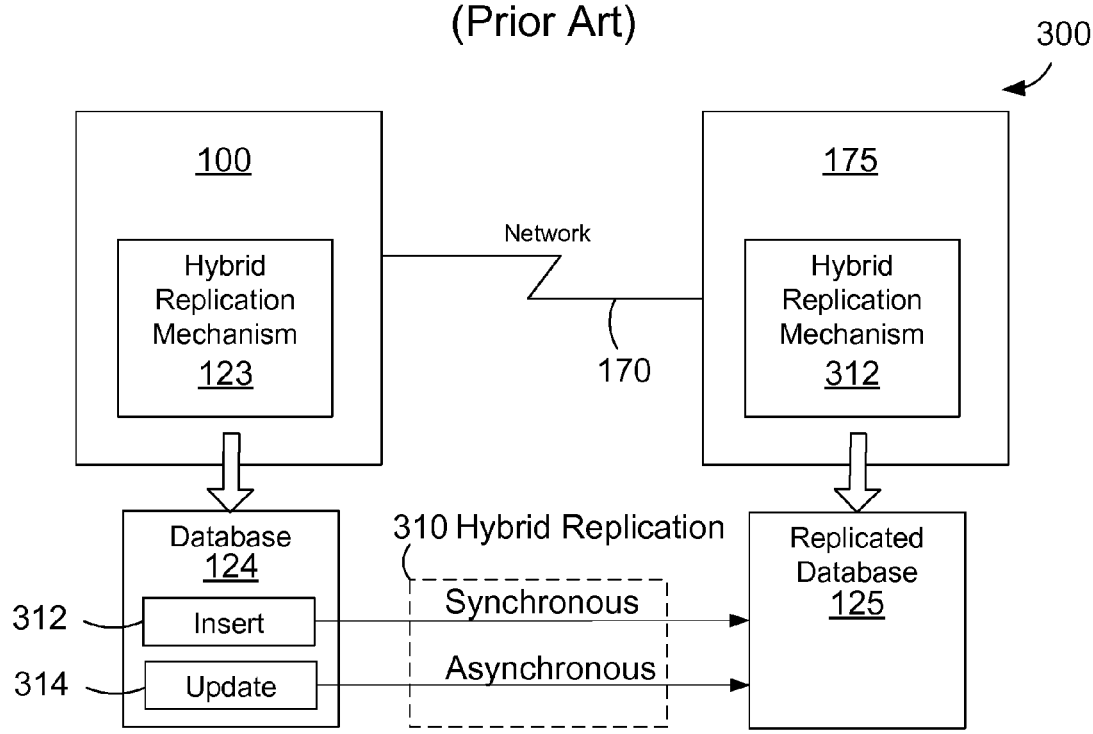
FIG. 3 illustrates a block diagram of a replication system using hybrid data replication.

FIG. 3 illustrates a block diagram of a computer system 300 using hybrid data replication as described and claimed herein. Hybrid data replication uses a combination of synchronous and asynchronous replication to provide an efficient replicated database where the replicated database can tolerate some delay in data updates but requires no data loss of new data. The system 300 includes two computers that may include the features of computer 100 shown in FIG. 1 and correspond to computers 100 and 175 in FIG. 1. The two computers 100, 175 are connected with a network 170. The computers 100, 175 include a hybrid replication mechanism 123, 312 that together replicate a local database 124 to a replicated database 125. The local database 124 is replicated to the replicated database 125 using hybrid replication 310. As used herein hybrid replication means synchronous replication is used for transaction that add new data to a database memory (such as INSERT 312 operations), and asynchronous replication is used for transactions that update or replace existing data in a database memory (such as UPDATE 314 database transactions). As used herein, an INSERT operation is a database operation that inserts a new database record into a database. Similarly, an UPDATE transaction is a database operation that changes or updates an existing record in a database. The claimed invention expressly extends to other data memory operations that have similar characteristics of memory UPDATE and INSERT as described above.

We will now consider an example of using hybrid database replication as described above. The application for this example is a military radar system that sweeps an enemy location every 30 ms for enemy targets. In this situation, a primary concern is that all new threats show up in the radar display without risk of loss of these threats. Enemy threats detected by the radar system are stored in a local database. A database replication system is employed to replicate the database holding the threat information to insure against a loss of the primary database. If there is a system failure, the replicated database must contain all targets on the primary system. Position of the threats will be updated on the next sweep, so the most up to date location data is not critical.

Continuing with the radar example, we assume at time t=0 the radar system reads threats A and B. These threats and their coordinates are synchronously replicated on the backup database with an INSERT transaction. At the 30 ms sweep, the radar detects a new location for the targets A and B. The new coordinates are replicated asynchronously with an UPDATE transaction. At the 60 ms sweep, the radar detects a new location for the targets A and B and a new target C. The new coordinates for A and B are replicated asynchronously with an UPDATE transaction, and the coordinates for the new target C is replicated synchronously. At time=69 ms, we assume a failure on the primary database occurs. As a result, the data on the replication system is read. The backup data holds data for all the targets, but the coordinates for A and B may be stale due to the asynchronous transaction not being completed before the failure. This stale data is not a critical problem but it is important that all the targets are accounted for on the backup database. At the next radar sweep, the new coordinates for A, B, and C are updated to the replicated database with an UPDATE transaction. The above description is summarized in the table below.

| Time | Radar Detection | Replication Transaction |
| --- | --- | --- |
| 0 ms | A, B | Insert Tx - A, B Synchronously |
| 30 ms | A, B | Update Tx - A, B Asynchronously |
| 60 ms | A, B, C | Update Tx - A, B Asynchronously |
|  |  | Insert Tx - C Synchronously |
| 69 ms | Failure | Use Backup system |
| 90 ms | A, B, C | Update Tx - A, B, C Asynchronously |

Figure 4:
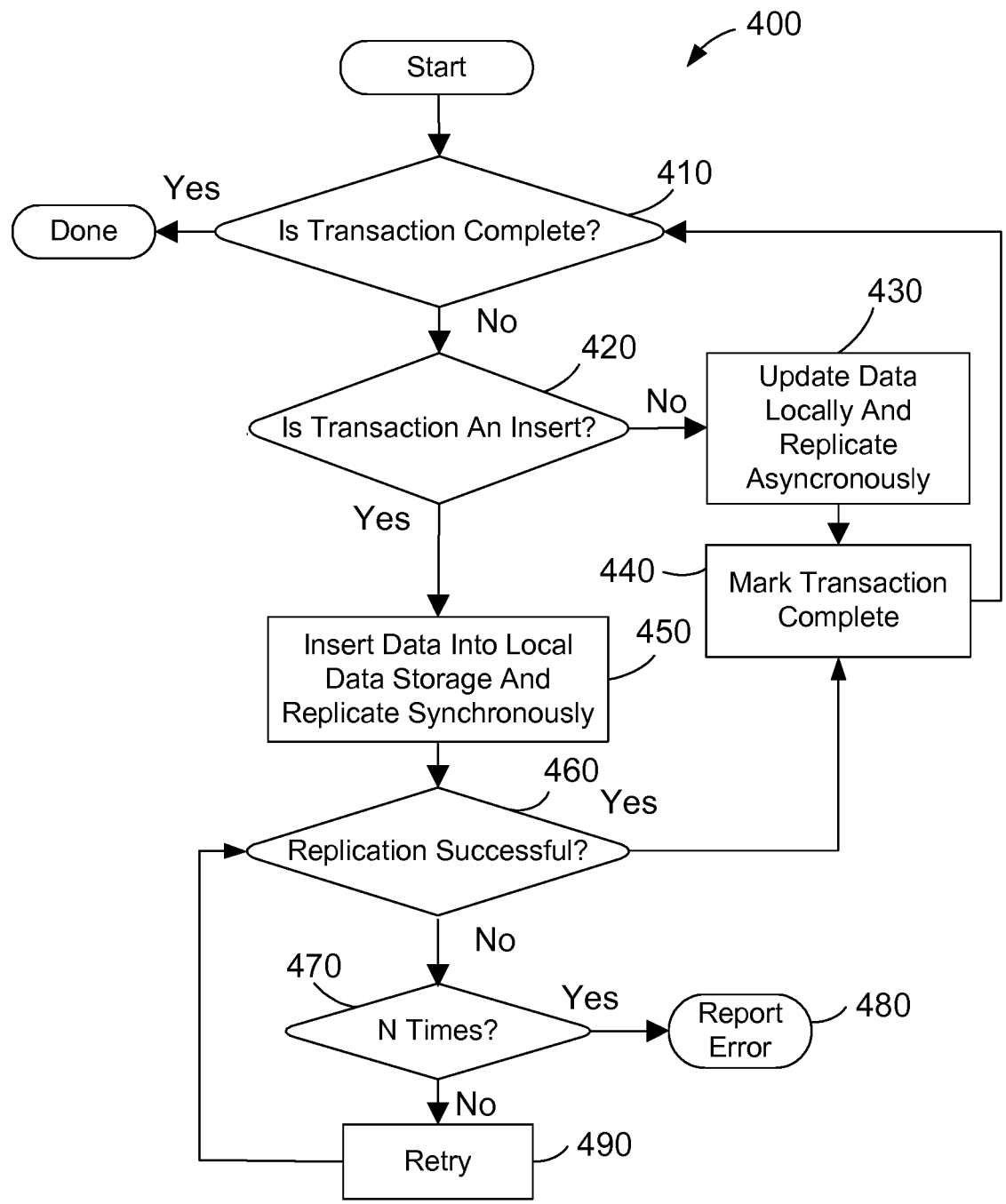
FIG. 4 is a method flow diagram for replicating a database using hybrid data replication as described herein.

FIG. 4 shows a method 400 for to data replication using a combination of synchronous and asynchronous replication of data from a local database to a replicated database. The steps in method 400 are preferably performed by the hybrid replication mechanism 123 (FIGS. 1 and 3) in conjunction with the hybrid replication mechanism 312 (FIG. 3) to process a database transaction to replicated it to a replicated database. First, determine if the transaction is complete (step 410). If the transaction is complete (step 410=yes) then the method is done. If the transaction is not complete (step 410=no) then determine if the transaction is an insert (step 420). If the transaction is not an insert (step 420=no) then update the transaction data locally and replicate to the replicated database using asynchronous replication (step 430). Next, mark the transaction as complete (step 440) and go to step 410. If the transaction is an insert (step 420=yes) then insert the transaction data into the local database and replicate the data to the replicated database using synchronous replication (step 450). Next determine if the replication is successful (step 460). If the synchronous replication was successful (step 460=yes) then mark the transaction as complete (step 440) and go to step 410. If the synchronous replication was not successful (step 460=no) then check the number of times the replication was attempted (step 470). If the retry is N times (step 470=yes) then report an error (step 480). If the retry has not been N times (step 470=no) then retry the replication (step 490) and return to step 460. Note that the number N in FIG. 4 is an integer threshold that determines how many times replication will be attempted before reporting an error.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As described above, a database manager utilizes a hybrid replication mechanism that combines synchronous and asynchronous replication of data from a local database to a replicated database. The combined use of synchronous and asynchronous in this manner provides an efficient replicated database where the replicated database can tolerate some delay in data updates but requires no data loss of new data.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
   at least one processor;
   a memory coupled to the at least one processor having a local database;
   a database replication mechanism that sends transactions to a replicated database using synchronous data replication and asynchronous data replication, where the database replication mechanism uses synchronous data replication to keep the replicated database updated with current information for transactions that add new data to the replicated database, and the database replication mechanism uses asynchronous data replication for transactions that update data in the replicated database, where the asynchronous data replication is updating at specified intervals with batches of data rather than when new data is present at the local database; and
   wherein the transaction to add new data to the replicated database is a database INSERT operation and the asynchronous replication transaction to update data in the replicated database is a database UPDATE operation.

2. The apparatus of claim 1 wherein the replicated database is associated with another computer system located remotely from the at least one processor.

3. The apparatus of claim 1 wherein the replicated database holds radar information that is updated using hybrid replication.

4. An apparatus comprising:
   at least one processor;
   a memory coupled to the at least one processor having a local database;
   a replicated database associated with another computer system located remotely from the at least one processor;
   a database replication mechanism that sends transactions to the replicated database using synchronous data replication and asynchronous data replication, where the database replication mechanism uses synchronous data replication to keep the replicated database updated with current information for transactions that add new data to the replicated database, and the database replication mechanism uses asynchronous data replication for transactions that update data in the replicated database, where the asynchronous data replication is updating at specified intervals with batches of data rather than when new data is present at the local database; and
   wherein the transaction to add new data to the replicated database is a database INSERT operation and the asynchronous replication transaction to update data in the replicated database is a database UPDATE operation.

* * * * *